United States Patent [19]

Sugama

[11] Patent Number: 4,927,462

[45] Date of Patent: May 22, 1990

[54] OXIDATION OF CARBON FIBER SURFACES FOR USE AS REINFORCEMENT IN HIGH-TEMPERATURE CEMENTITIOUS MATERIAL SYSTEMS

[75] Inventor: Toshifumi Sugama, Mastic Beach, N.Y.

[73] Assignee: Associated Universities, Inc., Washington, D.C.

[21] Appl. No.: 288,962

[22] Filed: Dec. 23, 1988

[51] Int. Cl.$^5$ ............................................. C04B 7/02
[52] U.S. Cl. ..................................... 106/99; 106/100; 106/90
[58] Field of Search ................ 106/90, 99; 423/447.1, 423/447.2, 447.6

[56] References Cited

U.S. PATENT DOCUMENTS

| | | | |
|---|---|---|---|
| 2,586,726 | 2/1952 | Schuetz et al. | 92/55 |
| 2,837,435 | 6/1958 | Miller et al. | 106/93 |
| 3,375,873 | 4/1968 | Mitchell | 106/90 |
| 3,657,082 | 4/1972 | Wells et al. | 423/447.2 |
| 3,695,916 | 10/1972 | Pike et al. | 423/447.1 |
| 3,746,506 | 7/1973 | Aitken et al. | 423/447.1 |
| 3,926,650 | 12/1975 | Lange et al. | 106/90 |
| 3,972,984 | 8/1976 | Iikuka et al. | 423/447.6 |
| 4,009,305 | 2/1977 | Fujimaki et al. | 423/447.1 |
| 4,111,710 | 9/1978 | Pairaudeu et al. | 106/99 |
| 4,286,991 | 9/1981 | Galer et al. | 106/90 |
| 4,286,992 | 9/1981 | Galer et al. | 106/90 |
| 4,326,891 | 4/1982 | Sadler | 106/99 |
| 4,336,022 | 6/1982 | Lynch et al. | 423/447.1 |
| 4,349,523 | 9/1982 | Hiramatsu et al. | 423/447.2 |
| 4,515,636 | 5/1985 | Carney et al. | 106/90 |
| 4,772,328 | 9/1988 | Pfeifer | 106/90 |
| 4,814,157 | 3/1989 | Uno et al. | 423/447.2 |

FOREIGN PATENT DOCUMENTS 58-181761  10/1983  Japan .

OTHER PUBLICATIONS

Sugama, et al., Cement and Concrete Research, vol. 18, pp. 290–300 (1988).

*Primary Examiner*—Mark L. Bell
*Assistant Examiner*—Sue Hollenbeck
*Attorney, Agent, or Firm*—Margaret C. Bogosian

[57] ABSTRACT

The interfacial bond characteristics between carbon fiber and a cement matrix, in high temperature fiber-reinforced cementitious composite systems, can be improved by the oxidative treatment of the fiber surfaces. Compositions and the process for producing the compositions are disclosed.

4 Claims, 2 Drawing Sheets

OXIDATION OF CARBON FIBER SURFACES FOR USE AS REINFORCEMENT IN HIGH-TEMPERATURE CEMENTITIOUS MATERIAL SYSTEMS

This invention was made with Government support under contract number DE-AC02-76CH00016, between the U.S. Department of Energy and Associated Universities, Inc. The Government has certain rights in the invention.

BRIEF DESCRIPTION OF THE INVENTION

The surface modification of the fiber used in fiber-reinforced cementitious compositions by oxidative treatment of the fiber surface improves the interfacial bond characteristics between the fiber and the cement matrix. The oxidation of these carbon-containing fibers introduces chemically active oxygen groups on the fiber surface, which preferentially react with neutralizing cations which dissociate from the cement.

BACKGROUND OF THE INVENTION

Cement slurries are used to support the intermediate casing pipe in geothermal wells, and to protect the casing from corrosive fluids and gases. The environment in which these cement slurries are used are subject to high hydrostatic pressures (up to 2,000 psi) and to high temperatures (up to about 350° C.).

Many methods and agents have been used to increase or improve the mechanical, physical, and microstructural characteristics of the cementitious compositions. One such method involves the use of reinforcing substances such as fibrous materials. Inorganic, mineral and organic-type fibrous materials, as represented by carbon, glass, and polyaramid fibers, have previously been evaluated for application as reinforcing materials in high-temperature lightweight cement matrix composites. Generally, the use of these high-performance and high-modulus fibers yields durable products capable of withstanding high air temperature operating conditions. However, when glass and polyaramid fibers embedded in cement matrices are exposed to a temperature of 300° C. or higher, the fibers are very susceptible to chemical decomposition by the strong alkaline media of cement slurries. Scanning electron microscopy (SEM) examination of glass fiber surfaces treated with $Ca(OH)_2$-saturated solutions at 300° C. reveals a morphological change on the surface; the fiber surfaces are surrounded by a reticular network structure of calcium silicate hydrate that was precipitated in the vicinity of the surface. The glass fiber, therefore, becomes fragile, leading to physical disintegration of the fiber-reinforced geothermal cement composites. Likewise, polyaramid fibers exposed to an alkaline solution at 300° C. also quickly deteriorate into small segments as a result of chemical disintegration of the organic macromolecule, thereby reducing the mechanical strength of the composite specimens.

Conversely, the addition of an adequate amount of carbon fiber to the autoclaved lightweight cement results in an increase in the mechanical properties. However SEM examination of the fracture surfaces reveals a fiber debonding-failure mechanism which appears to be due to poor bonding between the fiber and cement matrix. The observed low reinforcement efficiency of the fiber appears to be directly related to low interfacial shear strength. Therefore, good adhesion of the cement to the carbon fiber surface is needed in order to obtain efficient stress transfer. The ideal interfacial bond should be strong enough to hold the fibers and to allow a crack to propagate through the matrix without significant fiber pull out. On the other hand, an extraordinarily developed bond strength will produce a more brittle composite as a consequence of a decrease in the frictional stress transfer between the fiber and the matrix.

It is therefore an object of the present invention to provide a fiber-reinforced cementitious composition suitable for use in geothermal wells.

It is also an object of this invention to provide a fiber-reinforced cementitious composition with improved interfacial bonding between the fiber and the cement matrix.

It is also an object of this invention to modify the surface of the reinforcing fiber in order to promote adhesion of the fiber to the cement matrix.

It is also an object of this invention to provide reinforcing fibers which have been subject to oxidative treatment on the fiber surfaces. The oxidation of the fiber surface progressively introduces chemically active oxygen groups on the fiber surfaces. These oxygen groups preferentially react with neutralizing aluminum and calcium ions dissociated from the cement, thus forming an interfacial ionic reaction between the fiber surface and the cement matrix.

These objects and others will become evident from the following description.

DETAILED DESCRIPTION OF THE INVENTION

Figure 1:
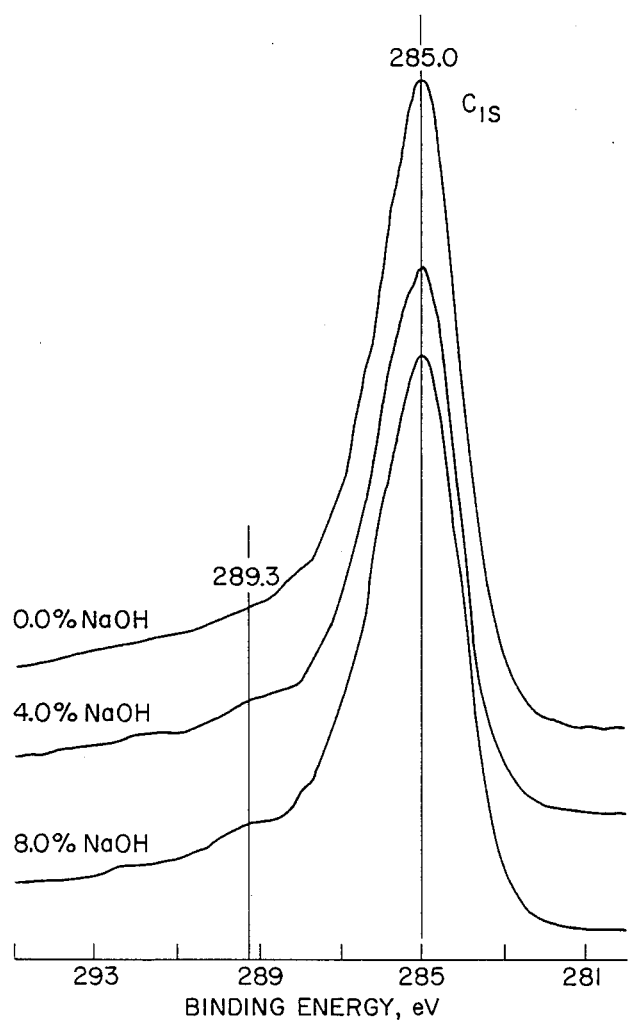
FIG. 1 is the high-resolution $C_{1s}$ spectra for as received and NaOH-treated carbon fiber surfaces.

The present invention is an improvement on fiber-reinforced cementitious compositions for use in geothermal wells. In general, these cements comprise a matrix of a Portland cement, a reinforcement material, and, optionally, one or more of the following components: a reactive filler such as silica flour; a retarder such as sodium tetra borate decahydrate; an organic surfactant used as a foam generator; and a foam stabilizer. The cementitious compositions of the present invention may also contain numerous other additives which have a beneficial effect on strength, pore structure, or processing behavior of the cement binder material. Possible additives include fumed silica, fly ash, ground quartz, blast furnace slag, pozzolanas, and the like. Practitioners in the art will recognize that these materials are commonly used in cementitious compositions.

The improvement embodied by the present invention concerns the reinforcement material and its interaction with the cement matrix. The use of fiber reinforcement substances as inhibitors of coalescence and percolation of air through the cement column is well known in the art. These reinforcement materials include, but are not limited to, chopped E-type glass, graphite, aramid, sisal, hemp, rami, jute, kraft, alumina, carbon, mineral fiber, polypropylene, and cotton.

The present invention comprises a carbon containing reinforcement fiber (including, but not limited to graphite, carbon, and mineral fiber) which has been subjected to an oxidative treatment resulting in a surface modification of the fiber. This surface modification of the carbon-containing fiber is responsible for an improved interfacial bonding between the fiber and the high temperature cement matrix. Extensive oxidation of the carbon-containing fiber introduces chemically active oxygen groups (functional groups such as carboxylic acid and Na-labeled carboxyl groups) on the fiber surface.

Furthermore, when fibers containing functional groups are incorporated into a cement matrix and subsequently exposed to a hydrothermal environment at 300° C., it is found that the fiber surface preferentially reacts with the neutralizing calcium cations dissociated from the cement. This interfacial ionic reaction occurring between the $Ca^{2+}$ ions and the two adjacent monobasic groups, such as —COOH and —COO$^-$Na$^+$, induces the formation of Ca-labeled carboxyl groups. The chemisorption of calcium to the carbon surface promotes the precipitation of CaO-rich cement hydration products on the fiber, thereby increasing the fiber cement interfacial bond strength.

In the preferred embodiment, the oxidation agent is a compound such as sodium hydroxide. Practitioners in the art will recognize that many other oxidation agents may be used within the scope of this invention.

The process of the present invention involves rinsing the surface of the fiber with deionized water in order to remove any contaminants. The rinsed surfaces are then exposed to an oxidant for up to about one hour. The fibers are again washed in deionized water, and subsequently dried.

In a preferred embodiment, the oxidant is a concentrated solution of sodium hydroxide, up to about 10% NaOH. Also preferred is exposing the surface of the fibers to a temperature of about 80° C.

The result of this process is a composition of the present invention, namely a fiber-reinforced cementitious composition wherein the interfacial bond characteristics between the fiber and the cement is improved over other known cementitious compositions.

It is not intended that the present invention be limited by the type of cement used. High temperature cements such as API classes G, H and J may be used in the practice of this invention. Portland cement API class H is preferred, but the invention is not intended to be limited thereby. Other cements, such as pozzolan, gypsum, and calcium aluminate, may also be used.

The preferred fibers, some of which have been enumerated above, are carbon-containing, and exhibit superior thermal resistance in air at a temperature of about 300° C. and above. The preferred reinforcing fiber is carbon-fiber, but the invention is not intended to be limited thereby.

The following examples describe implementation of the invention, and are not intended to limit the scope of the invention.

EXAMPLES

In each of the following examples, the following materials and procedures were used:

The 6.25 mm chopped carbon fibers and single strand of carbon fibers (containing 2000 or 4000 filaments) derived from a PAN (polyacrylonitrile) precursor, are commercially available from Hercules. Hercules AS chopped and strand fibers have already undergone a proprietary surface treatment. An API class H cement, commercially available from the Lehigh Portland Cement Co., was used as the matrix. A typical analysis of the cement was: 64.4 wt% CaO, 22.4 wt% $SiO_2$, 4.29 wt% $Al_2O_3$, 4.92 wt% $Fe_2O_3$, 0.8 w% MgO, and 2.2 wt% $SO_3$. To prevent retrogression of strength at high temperatures, silica flour having a particle size of <44 m was added to the cement.

The surface modification of the chopped and strand fibers was facilitated by rinsing the surfaces with deionized water to remove any contamination, and then exposing the surfaces for one hour in 0.4, 2.0, 4.0, and 8.0% NaOH solutions at a temperature of 80° C. The fibers were again washed in deionized water and subsequently dried in an oven at 150° C.

The chemical states and elemental compositions at the surface sites of treated and untreated fibers, before and after pull-out, were identified by precise determinations of binding energies and peak intensities using x-ray photoelectron spectroscopy (XPS). The spectrometer used was a V.G. Scientific ESCA 3 MK II: the exciting radiation was provided by a magnesium K x-ray source, operated at a constant power of 200 W (10 kV, 20 mA). The vacuum in the analyzer chamber of the instrument was maintained at $10^{-9}$ Torr.

The morphological and chemical aspects of the surface of treated fibers, and the cement hydration products formed in the cement fiber contact zone, were examined with an AMR 100-A scanning electron microscope (SEM) associated with TN-2000 energy-dispersive x-ray spectrometry (EDX).

X-ray powder diffraction analyses (XRD) were used to identify the phases present in the hydrated cement matrix.

An Instron TIMB testing machine, which advanced at 0.05 cm/min and 0.13 cm/min, was used to determine the flexural strength and to pull out the strand fiber, respectively.

EXAMPLE 1

Surface Characteristics of Treated Carbon Fibers

The results from XPS survey scans of as-received carbon fibers indicated the presence of the principal carbon 1S peak at 285.0 eV, and the secondarily intense oxygen 1S and fluorine 1S at approx. 400 and 685 eV, respectively. The incorporation of the identified oxygen, nitrogen, and fluorine atoms into the as received fiber surfaces is probably associated with the Hercules (proprietary) surface treatment process. Specifically, the fluorine signal may be due to fluorine-containing labeling reagents which were used to obtain information regarding the functionality of the treated carbon fiber surfaces. It is also possible that a certain amount of nitrogen from the precursor polymer PAN is not completely lost during conversion into carbon fibers.

In the pretreated fibers of the present invention, the extent of surface treatment as a function of NaOH concentration was estimated by comparison of the XPS peak areas which can be converted into the elemental concentrations by means of the differential cross sections for core-level excitation. In this work, the internally generated $C_{1S}$, $O_{1S}$, $N_{1S}$, $F_{1S}$ and $Na_{1S}$ peak areas were used to obtain the atomic fractions and percent ratios of treated surfaces. The quantitative data for the elements are listed in Table 1. As is evident from the variations in O/C, Na/C and F/C ratios, increasing the NaOH concentration results in an increase in the amount of O and Na incorporated into the fiber surface and a pronounced decrease in the F atom. The increased amount of sodium atom incorporated is due to the chemisorption of sodium ions dissociated from the concentrated NaOH in the aqueous media. From the introduction of additional oxygen into the surface during the treatment, it can be interpreted that the as-received carbon fiber surfaces were transformed into a further oxidative surface which tends to increase the chemical reactivity of the fiber by creating hydroxyl, carbonyl, and carboxyl groups. In addition, the NaOH treatment contributes to the elimination of the fluorine label from the as-received carbon fiber surfaces.

The major hydration product of the 300° C. 24 hr autoclaved cement matrix for all of the as-received and treated fiber reinforced cement specimens was identified by means of XRD analysis to be well-formed calcium silicate hydrates such as xonolite, $Ca_6Si_6O_{17}(OH)_2$. Therefore, the flexural strength and pull-out load are dependent upon the degree of the fiber-matrix interfacial bonds and independent of the phase and extent of cement hydration in the bulk cement past matrix. This clearly indicates that the introduction of numerous functional groups on the fiber surface by extensive oxidation improves bonding to the matrix.

TABLE 1

XPS Analyses of As-Received and Treated Carbon Fiber Surfaces

| NaOH Concentration | Element | Binding Energy | Atomic % | Atomic O/C | Percentage Ratios N/C | F/C | Na/C |
|---|---|---|---|---|---|---|---|
| 0.0% | C | 285.0 | 88.4 | 0.086 | 0.029 | 0.016 | 0 |
| | O | 532.7 | 7.6 | | | | |
| | N | 399.8 | 1.4 | | | | |
| | F | 684.8 | 1.4 | | | | |
| | Na | — | — | | | | |
| 0.4% | C | 285.0 | 87.88 | 0.097 | 0.026 | 0.013 | 0.003 |
| | O | 532.5 | 8.5 | | | | |
| | N | 400.3 | 2.3 | | | | |
| | F | 684.3 | 1.1 | | | | |
| | Na | 1071.1 | 0.3 | | | | |
| 2.0% | C | 285.0 | 87.5 | 0.099 | 0.027 | 0.011 | 0.005 |
| | O | 532.4 | 8.7 | | | | |
| | N | 400.5 | 2.4 | | | | |
| | F | 685.0 | 1.0 | | | | |
| | Na | 1071.0 | 0.4 | | | | |
| 4.0% | C | 285.0 | 86.7 | 0.107 | 0.031 | 0.005 | 0.009 |
| | O | 532.7 | 9.3 | | | | |
| | N | 400.8 | 2.7 | | | | |
| | F | 684.9 | 0.5 | | | | |
| | Na | 1071.0 | 0.8 | | | | |
| 8.0% | C | 285.0 | 86.1 | 0.115 | 0.030 | 0.002 | 0.014 |
| | O | 532.5 | 9.9 | | | | |
| | N | 399.6 | 2.6 | | | | |
| | F | 684.8 | 0.2 | | | | |
| | Na | 1071.1 | 1.2 | | | | |

EXAMPLE 2

Flexural Strength Tests

The composition of the cement matrix used in the preparation of specimens to determine the flexural strength of chopped fiber-reinforced cement composites consisted of 51 wt% class H cement, 17 wt% silica flour and 32 wt% water. Pre-treated chopped fibers in an amount of 0.3% by weight of the total matrix mass were added to the cement slurries, which were then cast into flexural test beams, 10 cm by 10 cm by 40 cm. The test beams subsequently were autoclaved for 24 hr at 300° C.

The results of these tests are shown in Table 2, below. The data clearly indicate that the flexural strength of the pre-treated fiber reinforced cementitious composition is dependent upon the oxygen concentration incorporated into the fiber surfaces. Table 2 shows that the pre-treatment process of the present invention is about two time stronger than non-treated fibers. Composites containing fiber with an O/C ratio of 0.115 had a strength of 14.59 MPa, corresponding to an improvement of about two times over that of specimens containing the as-received fiber (which had a O/C ratio of 0.086).

EXAMPLE 3

Pull-Out Load Tests

The composition of the cement matrix used in preparing specimens for the pull-out tests consisted of the same cementitious composition described in Example 2.

A 12.5 mm length of pre-treated strand fiber was embedded in the cement matrix having a size of 25 mm wide by 37.5 mm long by 1.25 mm thick. The specimen was then placed in the autoclave for 24 hr at 300° C. The resulting data from these specimens represent the average of three measurements.

Table 2 indicates that the pull-out load strength of the pre-treated fiber reinforced cementitious composition of the present invention represents an improvement of about two times over the non-treated fiber specimens. As with the flexural strength, pull-out load strength is dependent upon the oxygen concentration incorporated into the fiber surface.

TABLE 2

Flexural Strength and Pull-Out Load After Exposure in Autoclave at 300° C. for 24 hrs.

| NaOH % | O/C Ratio | Flexural Strength MPa | Pull-Out Load N |
|---|---|---|---|
| 0 | 0.086 | 7.75 | 28.55 |
| 0.4 | 0.097 | 9.70 | 30.21 |
| 2.0 | 0.099 | 11.50 | 36.69 |
| 4.0 | 0.107 | 12.80 | 51.21 |
| 8.0 | 0.115 | 14.59 | 58.08 |

EXAMPLE 4

Microprobe and elemental composition analyses in the interfacial regions between the fiber and the cement were conducted in order to obtain a better understanding of the mechanisms contributing to strong bonds. This information was obtained from the SEM examination and XPS elemental analysis of the surface of a strand pulled out of the matrix. In these tests, the removed strands were first washed in deionized water to remove any unbound cement paste from the surface, and then dried at 110° C. for 24 hrs. The removed "as-received" strand separated cleanly from the matrix during the pulling process, depicting typical carbon fiber pull-out behavior. Most of the fiber surface seemed to be void of hydration products, suggesting that an interfacial bond between the as-received fibers and cement matrices is weak.

In contrast, the fiber strand treated according to the present invention exhibited a good interfacial bond, evidenced by the presence of cement paste adhering irregularly to the treated surface. This shows that the cement matrix interacts more favorably with a highly oxidized surface.

Figure 2:
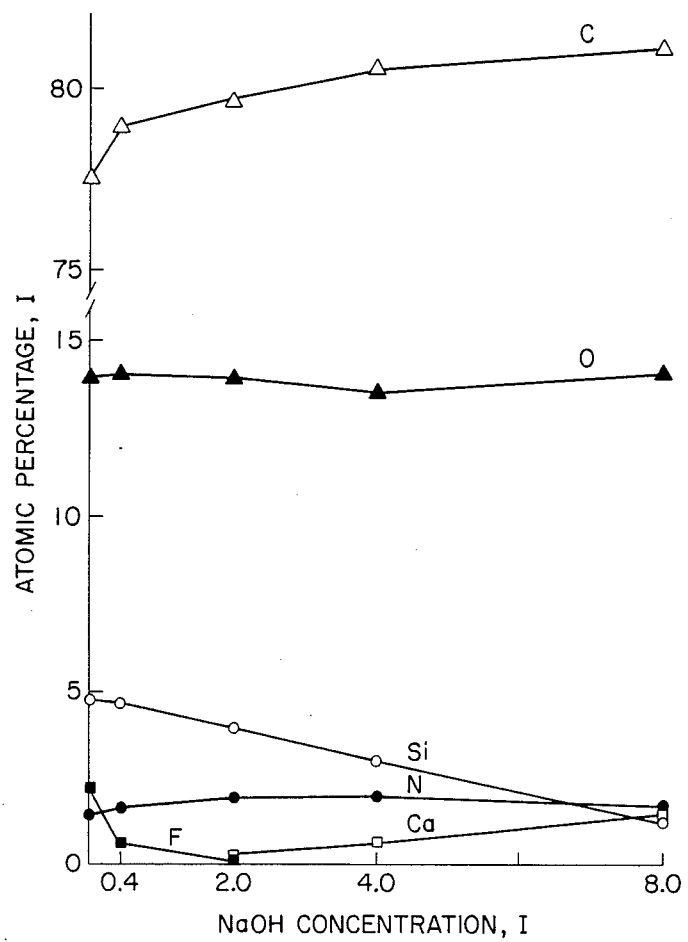
FIG. 2 is the atomic percentage of strand fiber surfaces removed from autoclaved cement matrix as a function of NaOH concentration.

The superiority of the pre-treated fibers of the present invention is also shown using XPS elemental analyses and quantitative evacuations of strand fiber surfaces, after removal from the autoclaved cement matrices. These results are shown in FIG. 2, in which the signal intensity for carbon (the major component at the surface sites) tends to monotomously increase with the NaOH concentration. The amount of oxygen incorporated into the fiber surface ranged from 13.5% to 14.1%. However, the detected level for all of these pulled out strand samples is relatively higher than that for the fiber surfaces prior to embedding in the cement matrix (see Table 1). The surface of the control strand fiber at 0% NaOH was characterized as containing 4.8% Si, 2.2% F, and 1.5% N. No discernible signal for calcium was detected. Since the silicon component is probably associated with the silicon dioxide, it appears that acertain amount of $SiO_2$ is present on the pulled out fiber surfaces. Thus, a $SiO_2$-rich surface reflects on the increased oxygen concentration. Of particular interest are the variations in silicon and calcium percentages plotted against the NaOH concentrations. As is evident in FIG. 2, the concentration of the Si component adhering to the fiber surface decreased with increased oxidation of the fiber by the concentrated NaOH treatment. However, the calcium concentration increased from 0.3%, when a 2.0% NaOH treatment was used, to 1.6% for the 8.0% NaOH treatment. As discussed above, the removed surface of the 8.0% NaOH-treated fiber exhibited locally deposited cement hydration products. Hence, the calcium species are probably due to the CaO in the hydration products bound to the fiber surfaces.

I claim:

1. In a Portland cementitious material system suitable for use in geothermal wells which contains a carbon fiber-reinforced cement, an improvement which comprises pre-treating said carbon fiber with a sodium hydroxide solution as an oxidizing agent so that said fiber has an oxidized fiber surface.

2. The composition of claim 1 wherein said oxidized fiber surface contains carboxylic acid or carboxyl functional groups.

3. A fiber-reinforced Portland cement comprising carbon fiber and Portland cement, wherein the surface of said carbon fiber is oxidized by treatment with sodium hydroxide prior to mixing with said Portland cement.

4. In a process for the production of a composite material from Portland cement and carbon fiber reinforcement material, the step which comprises pre-treating said carbon fibers with sodium hydroxide.

* * * * *